(12) United States Patent
Kojo et al.

(10) Patent No.: US 7,945,686 B2
(45) Date of Patent: May 17, 2011

(54) COMMUNICATION CONTROL APPARATUS AND METHOD

(75) Inventors: Yu Kojo, Kawasaki (JP); Masami Yabusaki, Kashiwa (JP)

(73) Assignee: NTT Docomo, Inc., Tokyo (JP)

( * ) Notice: Subject to any disclaimer, the term of this patent is extended or adjusted under 35 U.S.C. 154(b) by 184 days.

(21) Appl. No.: 12/325,467

(22) Filed: Dec. 1, 2008

(65) Prior Publication Data

US 2009/0144406 A1 Jun. 4, 2009

(30) Foreign Application Priority Data

Nov. 30, 2007 (JP) .................................. 2007-311398

(51) Int. Cl.
*G06F 15/16* (2006.01)
(52) U.S. Cl. ....................................................... 709/229
(58) Field of Classification Search .................. None
See application file for complete search history.

(56) References Cited

U.S. PATENT DOCUMENTS

| | | | | |
|---|---|---|---|---|
| 2005/0273510 | A1* | 12/2005 | Schuh | 709/225 |
| 2006/0149815 | A1* | 7/2006 | Spradling et al. | 709/205 |
| 2006/0234613 | A1* | 10/2006 | Hans et al. | 452/58 |
| 2008/0226049 | A1* | 9/2008 | Kumar et al. | 379/202.01 |

FOREIGN PATENT DOCUMENTS

| | | |
|---|---|---|
| EP | 1638354 A1 | 3/2006 |
| JP | 5-276160 A | 10/1993 |
| JP | 8-009063 A | 1/1996 |
| JP | 11-075263 A | 3/1999 |
| JP | 2005-328466 A | 11/2005 |
| WO | WO 2006/029526 A1 | 3/2006 |

OTHER PUBLICATIONS

3rd Generation Partnership Project; Technical Specification Group Services and System Aspects; IP Multimedia Subsystem (IMS), 3GPP TS 23.228, pp. 1-131, Jun. 2006.
Barnes et al., "A Framework for Centralized Conferencing: draft-left-xcon-framework-10", Microsoft Corporation, XCON Working Group, Internet-Draft, Nov. 9, 2007, 64 pages.
Extended European Search Report for European Application No. 08169402.8, dated Apr. 17, 2009, 5 pages.
Japanese Office Action dated Nov. 9, 2010, for Japanese Patent Application No. 2008-298458 (6 pgs.), with English translation.
Chinese Office Action, dated Jan. 12, 2011, pp. 1-5, with English translation (8 pgs.); Chinese Patent Application No. 200810179720.3, CCPIT Patent and Trademark Office, Beijing China.

* cited by examiner

*Primary Examiner* — Ario Etienne
*Assistant Examiner* — Clayton R Williams
(74) *Attorney, Agent, or Firm* — Brinks Hofer Gilson & Lione

(57) ABSTRACT

A communication control apparatus includes a registration request signal receiver, a registration section, a transmitter, a group communication control signal receiver, and a group communication controller. The request signal receiver receives, from at least one terminal differing from a plurality of group communication terminals that is performing or is to perform group communication through a communication network, a control terminal registration request signal requesting the registration of the terminal as a control terminal for controlling the group communication. The registration section registers the terminal which sent the control terminal registration request signal as a control terminal. The transmitter sends, to that terminal, information indicating that the terminal has been registered as a control terminal. The control signal receiver receives from the terminal a group communication control signal for controlling the group communication. The group communication controller starts or changes the group communication in accordance with the group communication control signal.

3 Claims, 8 Drawing Sheets

Fig. 4A

| GROUP ID | XXXX |
|---|---|
| NUMBER OF GROUP USERS | 6 |
| PARTICIPATING USER IDs | P, Q, R, ···U |
| START TIME | 19:00 |
| CONTROL TERMINAL | NOT REGISTERED |

| REGISTERED USER ID | P |
|---|---|
| NAME | |
| AGE | |
| INTEREST | |
| OCCUPATION | |

| CONTENT | DESCRIPTION |
|---|---|
| CONTENT A | APPLAUSE |
| CONTENT B | BOOING |
| CONTENT C | QUIZ 1 |
| | ... |

| CONTROL USER ID | A |
|---|---|
| NAME | |
| AGE | |
| INTEREST | |
| OCCUPATION | |

2044

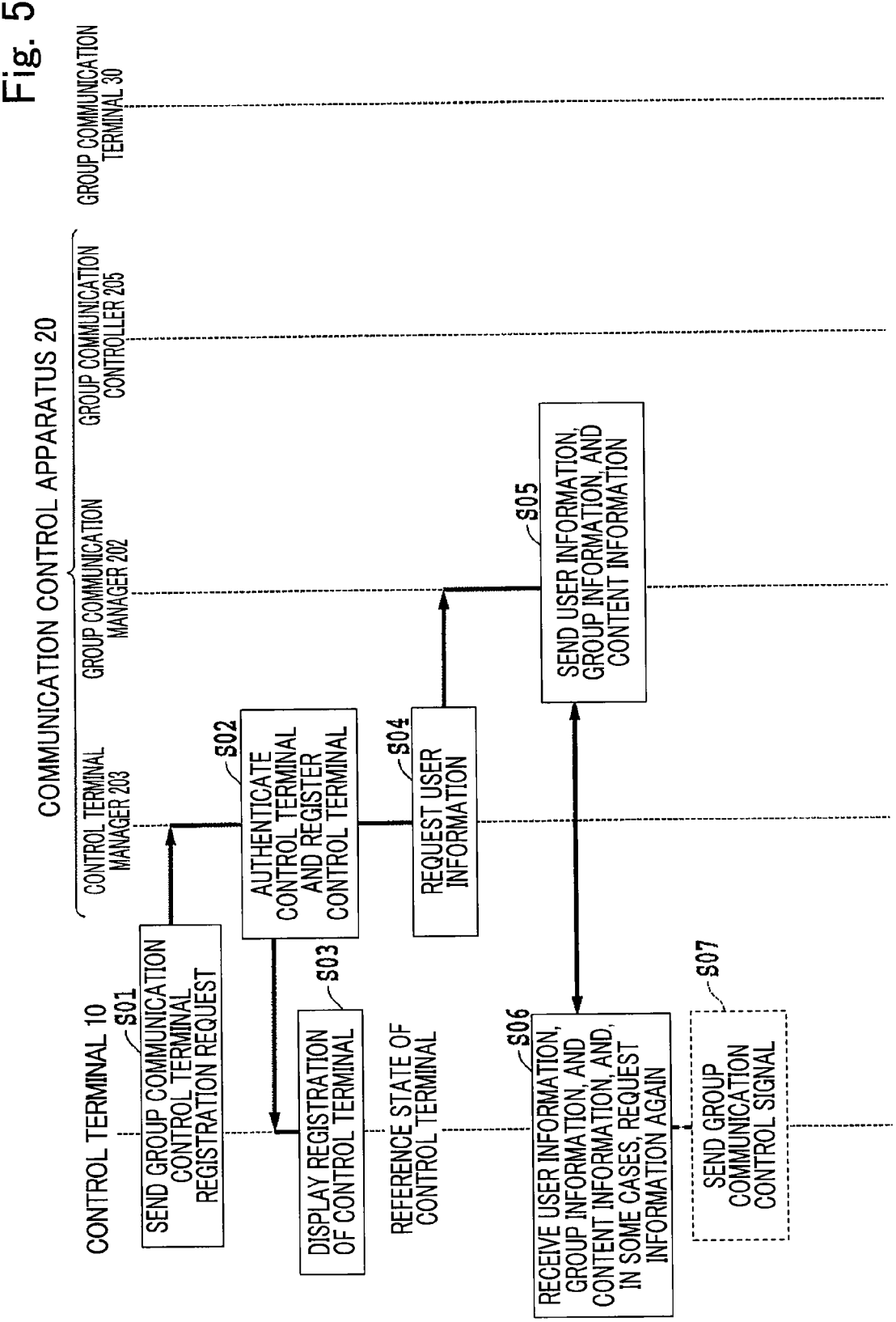

COMMUNICATION CONTROL APPARATUS AND METHOD

RELATED APPLICATIONS

This application claims priority under 35 U.S.C. §119 to Japanese Patent Application No. JP2007-311398 filed on Nov. 30, 2007, the entire content of which is hereby incorporated by reference.

BACKGROUND OF THE INVENTION

1. Field of the Invention

The present invention relates to communication control apparatuses and methods, and more specifically, to a communication control apparatus and a method for allowing a user not participating in group communication to control the group communication.

2. Description of the Related Art

The IP multimedia subsystem (IMS) is a solution for implementing, by using an Internet Protocol (IP) network, services conventionally performed by fixed-line communication, mobile communication, and broadcasting. IMS has made it possible to provide voice telephony services and video phone services on IP networks (refer to 3rd Generation Partnership Project; Technical Specification Group Services and System Aspects; IP Multimedia Subsystem (IMS), 3GPP TS 23.228, for instance). IMS also allows audio conferencing, video conferencing, and other communication services (hereinafter referred to as group communication), in which a plurality of communication terminals perform mutual communication, to be provided on IP networks. The terminals participating in the group communication are hereinafter referred to as group communication terminals.

In voice call communication, video phone communication, and audio conferencing communication in the conventional system, only users participating in the communication are allowed to form a group of a plurality of participants and to perform communication control operations, as needed.

SUMMARY OF THE INVENTION

Accordingly, it is an object of the present invention to provide a communication control apparatus and a method that allow group communication to be controlled by a user not participating in the group communication. It is another object of the present invention to provide a communication control apparatus and a method that allow group communication detail information, that is, the details of group communication, to be monitored by a user not participating in the group communication. The group communication control operations include the setting of users participating in the group communication and the insertion of audio, video, and other information into the group communication.

The foregoing objects are achieved according to one aspect of the present invention through the provision of a communication control apparatus including a registration request signal receiver for receiving, from at least one terminal differing from a plurality of group communication terminals that is performing or is to perform group communication through a communication network, a control terminal registration request signal requesting the registration of the terminal as a control terminal for controlling the group communication performed by the plurality of group communication terminals; a registration section for registering the terminal which sent the control terminal registration request signal as a control terminal; a registration-information transmitter for sending, through the communication network to the terminal registered by the registration section, information indicating that the terminal has been registered as a control terminal; a group communication control signal receiver for receiving through the communication network from the terminal a group communication control signal for controlling the group communication; and a group communication controller for starting or changing the group communication in accordance with the group communication control signal.

With this configuration, a chance to control the communication made by the plurality of users can be provided for a user not participating the communication.

The communication control apparatus may further include a determining section for determining, when a plurality of control terminals are registered, whether or not the group communication should be controlled in accordance with the group communication control signal sent from any of the plurality of control terminals.

The communication control apparatus described immediately above may further include a transfer section for transferring the group communication control signal sent from any of the plurality of control terminals to the other control terminals of the plurality of control terminals; and an opinion receiver for receiving information indicating an opinion related to the group communication control signal from the other control terminals among the plurality of control terminals; wherein the determining section determines, based on the information indicating the opinion, whether the group communication should be controlled in accordance with the group communication control signal.

Alternatively, the communication control apparatus may further include a transfer section for transferring the group communication control signal sent from any of the plurality of control terminals to the other control terminals of the plurality of control terminals; a mutual communication permitter for connecting the control terminals including the control terminal which has sent the group communication control signal and the other control terminals for allowing users of the control terminals to have a discussion on the group communication control signal; and an opinion receiver for receiving information indicating an opinion related to the group communication control signal from the plurality of control terminals; wherein the determining section determines, based on the information indicating the opinion, whether the group communication should be controlled in accordance with the group communication control signal.

The communication control apparatus may further include a transmission request signal receiver for receiving a transmission request signal requesting the transmission of group communication detail information indicating the details of the group communication, from the at least one terminal differing from the plurality of group communication terminals through the communication network; and a transmission controller for controlling the transmission of the group communication detail information through the communication network to the at least one terminal differing from the plurality of group communication terminals, which has sent the transmission request signal.

In the communication control apparatus, the group communication controller may insert content into the group communication, in accordance with content-identifying information included in the group communication control signal.

With this configuration, a communication system that can offer entertainments based on the content (such as audio or video data) can be provided.

The communication control apparatus described immediately above may further include a content storage for storing a candidate of content to be inserted into the group communication; a content information transmitter for reading content information identifying the candidate of the content from the content storage and for transmitting the content information to the control terminal; and a content reader for reading, from the content storage, the content corresponding to the content-identifying information included in the group communication control signal; wherein the group communication controller inserts the content read by the content reader into the group communication.

The foregoing objects are achieved according to another aspect of the present invention through the provision of a communication control method including the steps of: receiving, from at least one terminal differing from a plurality of group communication terminals that is performing or is to perform group communication through a communication network, a control terminal registration request signal requesting the registration of the terminal as a control terminal for controlling the group communication performed by the plurality of group communication terminals; registering the terminal which sent the control terminal registration request signal as a control terminal; sending information indicating that the terminal has been registered as a control terminal, through the communication network to the terminal registered; receiving, from the terminal through the communication network, a group communication control signal for controlling the group communication; and starting or changing the group communication in accordance with the group communication control signal.

As has been described above, the present invention can provide a communication control apparatus and a method that allow a user not participating in group communication to control the group communication in various ways.

BRIEF DESCRIPTION OF THE DRAWINGS

FIG. 4A to FIG. 4D show example structures of information stored in an information storage device according to the embodiment of the present invention;

FIG. 5 shows a flowchart of a process in the communication system according to the embodiment of the present invention;

DESCRIPTION OF THE PREFERRED EMBODIMENTS

Figure 1:
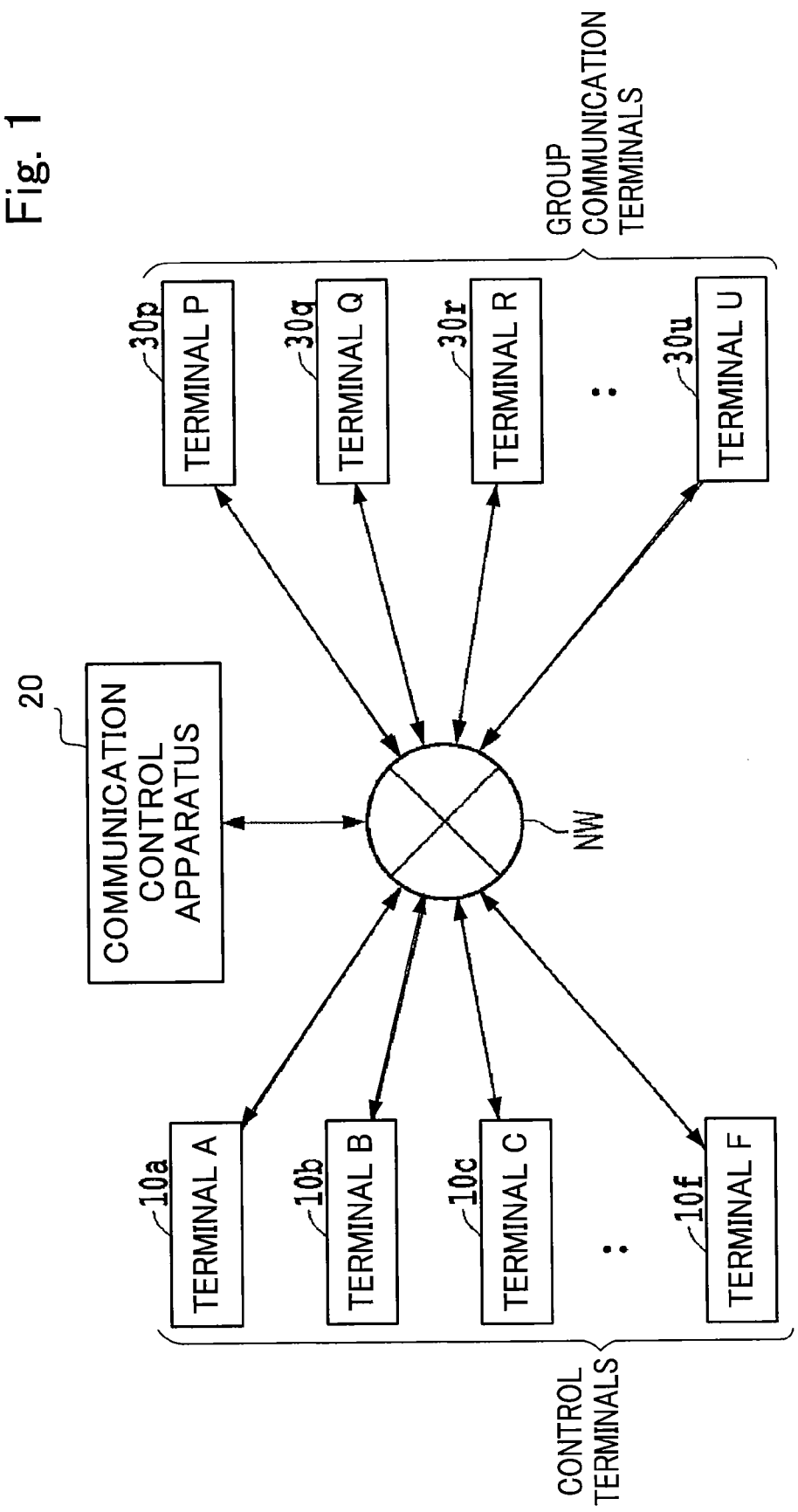
FIG. 1 is a diagram showing the structure of a communication system according to an embodiment of the present invention.

An embodiment of the present invention will be described below in detail with reference to the drawings. Identical or like elements are denoted by the same or like reference characters, and redundant descriptions will be avoided.

FIG. 1 is a diagram showing a general structure of a whole communication system that includes a communication control apparatus according to the present invention. The shown communication system includes a plurality of terminals 10 and 30, a communication control apparatus 20, and a communication network NW.

In the embodiment, the communication network NW is a mobile communications network that includes a base station, a base-station control apparatus, an exchange, and the like, which are not shown in the figure. The communication network NW can also be a fixed communications network or a communication network connecting a mobile communications network and a fixed communications network together. The communication control apparatus 20 may also be a component of the communication network NW.

A plurality of users participating in group communication use terminals (group communication terminals) 30p to 30u individually. In group communication, one user communicates with other users in the same group or in the same subgroup within the group through the communication network NW under the control of the communication control apparatus 20.

Users not participating in the group communication use terminals (control terminals used by monitoring users) 10a to 10f individually, and can send a group communication control signal to the communication control apparatus 20 to control the group communication through the communication control apparatus 20. The users not participating in the group communication can also request the transmission of group communication detail information, that is, the details of group communication, by sending a transmission request signal to the communication control apparatus 20, and can monitor the group communication by receiving the group communication detail information from the communication control apparatus 20.

The control terminal 10 sends a control terminal registration request signal to register itself as a terminal for controlling the group communication. Upon receiving the signal, the communication control apparatus 20 registers the control terminal 10 as a control terminal and sends to the control terminal 10 either information indicating that the terminal has been registered as a control terminal or information prompting the user of the control terminal 10 to control the group communication, or both.

The communication control apparatus 20 receives a signal for controlling group communication (group communication control signal) from the control terminal 10 and controls the group communication terminal 30 for starting or changing the group communication in accordance with the group communication control signal.

The communication control apparatus 20 stores the following information:

terminal identification information and the name, age, interest, occupation, and other information of the user (user information) of the group communication terminal 30 relating to the group communication, information of the group concerning the group communication through the communication control apparatus 20 (group communication information), information of candidates of contents that can be inserted into the group communication (content information), terminal identification information and the name, interest, occupation, and other information of the user (monitoring user information) of the control terminal 10 registered as a control terminal for the group communication, and information of the group to be monitored using the group communication detail information (monitor group information).

The communication control apparatus 20 transmits necessary information among the stored information to the control terminal 10, as needed.

When the control terminal 10 sends the transmission request signal requesting the transmission of the group communication detail information, the communication control apparatus 20 receives the transmission request signal and sends the group communication detail information to the control terminal 10 according to the transmission request signal. Whenever the communication control device 20 receives a transmission request signal from a control terminal 10, the communication control device 20 transmits the group communication detail information to the control terminal 10 which sent the transmission request signal.

In this embodiment, a single communication control apparatus controls both mutual communication within the group and the operation requested by the control terminal 10. However, these operations may be separately controlled by different apparatuses.

Figure 2:
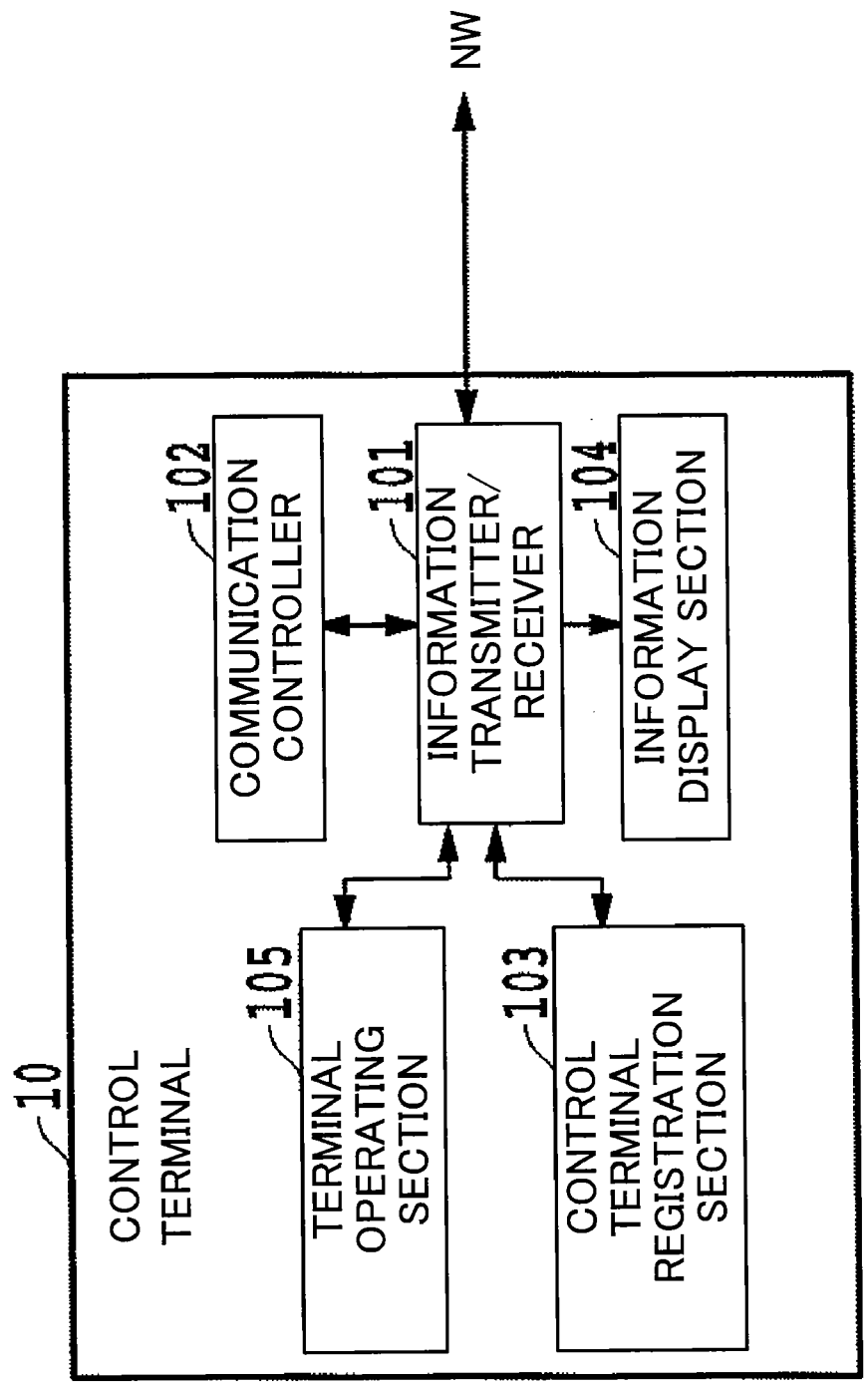
FIG. 2 is a diagram showing the structure of a control terminal according to the embodiment of the present invention.

FIG. 2 is a diagram showing the structure of the control terminal 10 according to the embodiment. The shown control terminal 10 includes an information transmitter/receiver 101, a communication controller 102, a control terminal registration section 103, an information display section 104, and a terminal operating section 105.

The information transmitter/receiver 101 includes a wireless transmission/reception device for connecting to the communication network NW under control of the communication controller 102 and sends information input from the terminal operating section 105 or the like to the communication control apparatus 20 through the communication network NW. The information transmitter/receiver 101 receives group communication detail information, such as video phone data, sent through the communication network NW under the control of the communication control apparatus 20 and passes the information to the information display section 104 through a bus or memory, which is not shown in the figure. The information transmitter/receiver 101 is adapted to also receive the user information, group communication information, content information, monitoring user information, and monitoring group information stored in the communication control apparatus 20 through the communication network NW and transfer the information to the information display section 104.

When the communication control apparatus 20 sends information prompting the user of the control terminal 10 to control the group communication, through the communication network NW, the information transmitter/receiver 101 receives the information and passes the information to the information display section 104. The information transmitter/receiver 101 also receives a request to modify, add, or obtain the user information, group communication information, content information, or monitoring group information, input from the terminal operating section 105, and sends the request to the communication control apparatus 20.

The information display section 104 of the control terminal 10 receives from the information transmitter/receiver 101 the group communication detail information sent through the communication network NW under the control of the communication control apparatus 20 and reproduces the information in a user-viewable form (moving image display function). The information display section 104 also displays the user information sent from the communication control apparatus 20, information prompting the user of the control terminal 10 to control the group communication, and the like.

The terminal operating section 105 can be an input device for receiving various types of information input or selected by the user, such as a button, a keyboard, a keypad, a microphone, or a camera. The terminal operating section 105 sends the input information which may include audio information and video information to the information transmitter/receiver 101.

The communication controller 102 controls communication between the control terminal 10 and the communication control apparatus 20. More specifically, the communication controller 102 sends and receives a control message (signal) to and from the information transmitter/receiver 101 for the connection processing.

The control terminal registration section 103 performs processing to register the control terminal 10 as a control terminal in the communication control apparatus 20 and processing to deregister the terminal 10. More specifically, the control terminal registration section 103 sends a signal for requesting the registration of a control terminal for controlling the group communication (control terminal registration request signal) or a signal for requesting the deregistration of the control terminal 10 (control terminal deregistration request signal) through the information transmitter/receiver 101 to the communication control apparatus 20.

Figure 3:
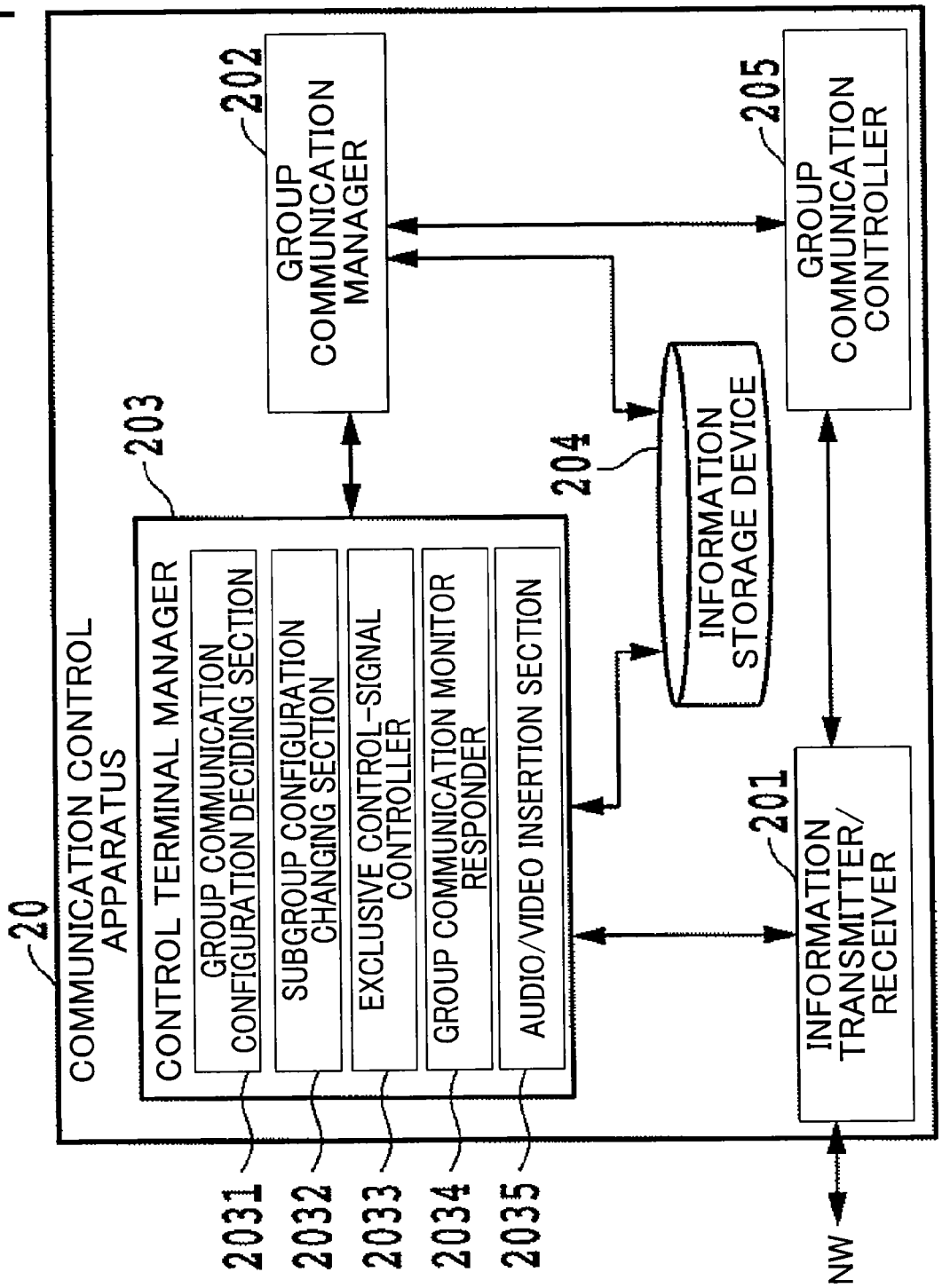
FIG. 3 is a diagram showing the structure of a communication control apparatus according to the embodiment of the present invention.

FIG. 3 is a diagram showing the structure of the communication control apparatus 20 of the present embodiment. The shown communication control apparatus 20 includes an information transmitter/receiver 201, a control terminal manager 203, a group communication manager 202, a group communication controller 205, and an information storage device 204. The communication control apparatus 20 can be a computer that includes a CPU, a memory such as a RAM, an auxiliary storage device such as a hard disk drive, and a communication device such as a network interface card (NIC).

The information transmitter/receiver 201 sends and receives the group communication detail information, insertion control information for inserting audio, video, and other content into the group communication, and control information needed to change the connection pattern, this information being exchanged between the control terminal 10 and the group communication controller 205 in the communication control apparatus 20. More specifically, the information transmitter/receiver 201 receives the following signals from the control terminal 10 through the communication network NW: a control terminal registration request signal, a control terminal deregistration request signal, a group communication control signal, and a transmission request signal requesting the transmission of the group communication detail information. The information transmitter/receiver 201 sends the following information to the control terminal 10 through the communication network NW: information indicating the registration of the control terminal, information prompting the user of the terminal 10 to control the group communication, and the group communication detail information.

The control terminal manager 203 includes a group communication configuration deciding section 2031, a subgroup configuration changing section 2032, an exclusive control-signal controller 2033, a group communication monitor responder 2034, and an audio/video insertion section 2035.

When the information transmitter/receiver 201 (registration request signal receiver) receives the control terminal registration request signal from the control terminal 10, the control terminal manager 203 (registration section) stores monitoring user information 2044 related to the monitoring user using the control terminal 10 which sent the signal, in a control terminal information storage section of the information storage device 204. The monitoring user information 2044 includes a control user ID for identifying the control terminal 10 or the monitoring user of the control terminal 10, sent with the control terminal registration request signal. Thus, the control terminal manager 203 (registration section) registers the terminal which sent the control terminal registration request signal as a control terminal. The monitoring user information 2044 may also include information about the user of the control terminal 10, such as the user name. FIG. 4D shows an example of the monitoring user information 2044.

Besides storing the monitoring user information 2044, the control terminal manager 203 (registration-information transmitter) sends information indicating that the registration of the control terminal has been completed through the communication network NW to the control terminal 10 registered in the control terminal information storage section of the information storage device 204. When the group communication manager 202 inquires about all or part of group communication information 2041, the control terminal manager 203 sends information prompting the user of the control terminal 10 to control the group communication, through the information transmitter/receiver 201, to the control terminal 10 registered as a control terminal. FIG. 4A shows an example of the group communication information 2041 stored in a group information storage section of the information storage device 204. The group communication information 2041 includes information for identifying group communication (group ID), the number of users forming (participating in) the group (the number of group users), the IDs of users participating in the group communication (participating user IDs), group communication start time, and the control user ID of the control terminal 10 registered as a control terminal of the group communication. FIG. 4A shows an example in which no control terminal 10 is registered as a control terminal. As controlled by the communication control apparatus 20, at least one control user ID can be stored in the control terminal field of the group communication information 2041 to register the corresponding control terminal.

When the information transmitter/receiver 201 (group communication control signal receiver) receives the group communication control signal from a terminal 10, the control terminal manager 203 notifies the group communication manager 202 of the reception, in order to register the source terminal 10 of the group communication control signal as a control terminal for controlling the group communication. The group communication control signal includes a control user ID for identifying the control terminal 10 which sent the signal and information for identifying group communication to be controlled (group ID). In the group communication manager 202, the terminal having the control user ID is registered as a control terminal in the group communication information 2041 (FIG. 4A) of the group communication to be controlled. The control user ID is deleted when a group communication control signal that includes a request for deregistration of the control terminal is received from the terminal or when a control terminal deregistration request signal is received.

After the control terminal manager 203 reports to the group communication manager 202 that the group communication control signal that includes the group ID is received, when the control terminal manager 203 receives from the group communication manager 202 a notice that the group communication information identified by the group ID indicates the registration of a plurality of control terminals, the control terminal manager 203 activates the exclusive control-signal controller 2033. When the control terminal manager 203 receives from the group communication manager 202 a notice that the group communication information identified by the group ID indicates that only the control terminal 10 is registered, the control terminal manager 203 activates the group communication configuration deciding section 2031, the subgroup configuration changing section 2032, and the audio/video insertion section 2035 to process the group communication control signal.

The exclusive control-signal controller 2033 (determining section) of the control terminal manager 203 determines, using an application (majority decision, agreement, or the like), whether or not the group communication should be controlled in accordance with the group communication control signal. If it is determined that the group communication should be controlled in accordance with the group communication control signal, the determination is reported to the group communication configuration deciding section 2031, the subgroup configuration changing section 2032, and the audio/video insertion section 2035 of the control terminal manager 203, to let them handle the group communication control signal.

The group communication configuration deciding section 2031 determines the configuration of group communication on the basis of the group communication control signal, sets up or changes the information of the group concerning the group communication (such as the number of group users, the participating users, the start time, and the end time), and reports the results to the group communication manager 202.

The subgroup configuration changing section 2032 sets up or changes information of a subgroup formed of some of the members of the group decided by the group communication configuration deciding section 2031 (such as the number of users participating in each subgroup, the participating users (members), the start time, and the end time) on the basis of the group communication control signal, and reports the results to the group communication manager 202.

The audio/video insertion section 2035 (content information transmitter) queries the information storage device 204 (content storage) about content information related to all possible content candidates that can be inserted into the group communication and sends the content information to the control terminal 10 through the information transmitter/receiver 201. The user of the control terminal 10 selects, from among the all possible content candidates indicated by the content information, one or more contents to be inserted into the group communication, and as a result, the control terminal 10 sends the group communication control signal including content-identifying information identifying the selected contents. The audio/video insertion section 2035 also requests the group communication manager 202 (content reader) to read, in accordance with the group communication control signal that includes content-identifying information identifying the contents selected by the user of the control terminal 10, the contents corresponding to content-identifying information from the information storage device 204 and to insert the contents into the group communication or subgroup communication. The group communication manager (content reader) 202 reads the corresponding contents from the information storage device 204 and instructs to the group communication controller to inserts the contents into the group communication or subgroup communication.

The information transmitter/receiver 201 (transmission request signal receiver) receives a transmission request signal requesting the transmission of group communication detail information indicating the details of the group communication, from the control terminal 10. In accordance with the transmission request signal requesting the transmission of the group communication detail information that includes the control user ID and the group communication ID, the group communication monitor responder 2034 (transmission controller) of the control terminal manager 203 requests the group communication manager 202 to send the group communication detail information to the control terminal 10, which has sent the transmission request signal, so that the monitoring user can watch and/or listen the details of the group communication at the control terminal 10 which sent the transmission request signal.

Upon receiving the group communication control signal that includes the control user ID and the group communication ID, from the control terminal manager 203, the group communication manager 202 registers the control user ID in the control terminal field in the group communication information 2041 (FIG. 4A) of the group communication corresponding to the group ID.

When the control user ID of a control terminal is stored for the first time in the group communication information 2041 while the group communication is in progress, the group communication manager 202 sends a group communication change control signal to the group communication controller 205, in accordance with the group communication control signal. When a second or subsequent control terminal is specified in the group communication information 2041, the group communication manager 202 notifies the control terminal manager 203 of the registration of a plurality of control terminals for the group communication. When the group communication is not performed, the group communication manager 202 sends a group communication start control signal to the group communication controller 205 in accordance with the group communication control signal, in order to start connecting the group communication terminals 30.

The group communication controller 205 inserts audio, video, and other content into the group communication, changes the connection pattern, or performs other processing, in accordance with the change control information or start control information of the group communication, based on the group communication control signal sent from the control terminal 10, that is, in accordance with the group ID, participating user IDs, connection pattern, schedule, and content-identifying information. Audio or video stored in a content information storage section (content storage) of the information storage device 204, as shown in FIG. 4C, may be inserted in accordance with the group communication control signal. Alternatively, audio or video information sent from the control terminal 10, or audio or video information stored in an external communication control apparatus may be inserted in accordance with the group communication control signal. The audio and video information of the group communication is sent to the control terminal 10 through the information transmitter/receiver 201.

The information storage device 204 stores the group communication information 2041, user information 2042, content information 2043, and the monitoring user information 2044. The information storage device 204 may also store the video and audio to be inserted into the group communication. FIG. 3 shows that the information storage device 204 is included in the communication control apparatus 20, but the information storage device 204 may be outside the communication control apparatus 20.

FIG. 4A to FIG. 4D show information stored in the information storage device 204: FIG. 4A shows an example of the group communication information 2041; FIG. 4B shows an example of the user information 2042; FIG. 4C shows an example of the content information 2043; and FIG. 4D shows an example of the monitoring user information 2044.

The group communication information 2041 is sent from the control terminal manager 203 and includes the number of participants in the group communication, identifiers of participating users, and the group communication start time (and/or the end time). The control terminal manager 203 outputs to the control terminal 10 information prompting the user of the control terminal 10 to generate the group communication information 2041. The group communication manager 202 assigns a group ID to the group communication information 2041 in accordance with the group communication control signal and stores it in the group information storage section of the information storage device 204. The group communication manager 202 changes the connection pattern represented in the group communication information 2041, in accordance with the connection status in communication, and the updated information is stored in the group information storage section of the information storage device 204.

The operations of the communication system in this embodiment will be described next.

Figure 6:
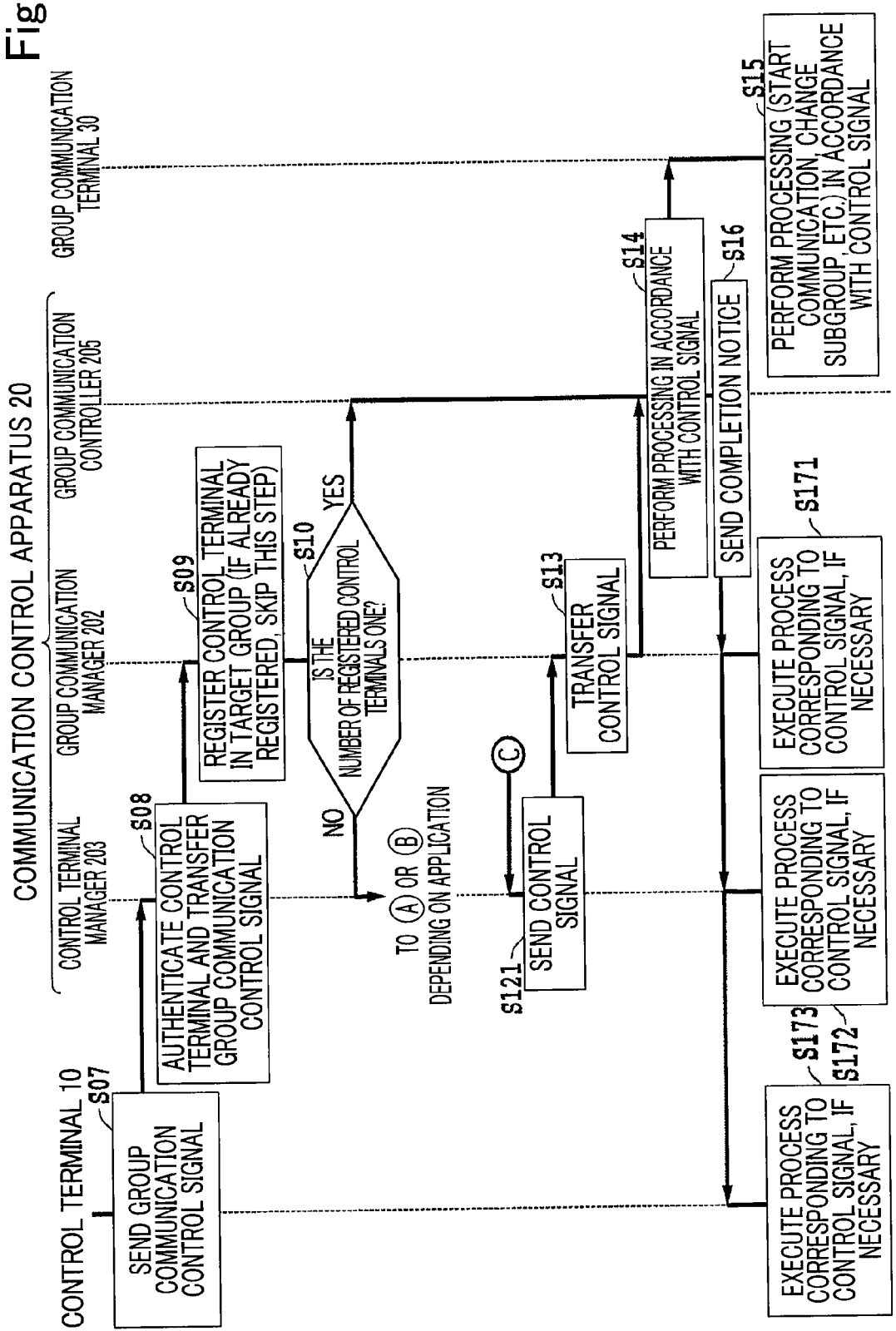
FIG. 6 shows a flowchart of another process in the communication system according to the embodiment of the present invention.

FIGS. 5 and 6 show flowcharts showing group communication control operations performed in the communication system in the embodiment.

In the operation shown in FIG. 5, the control terminal 10 sends a control terminal registration request signal to the communication control apparatus 20, and the control terminal manager 203 of the communication control apparatus 20 receives the signal via the information transmitter/receiver 201 (registration request signal receiver) at step S01.

The control terminal manager 203 (registration section) of the communication control apparatus 20 stores the monitoring user information of the control terminal 10 which has sent the control terminal registration request signal, in the control terminal information storage section of the information storage device 204 (S02). The control terminal manager 203 (registration-information transmitter) then sends information indicating the registration of the control terminal to the control terminal 10. It is desired that authentication information of the control terminal be stored in the information storage device 204 and that authentication be performed when the monitoring user information is stored. The control terminal 10 displays the information indicating the registration of the control terminal on the information display section 104 (S03).

The control terminal manager 203 of the communication control apparatus 20 then requests the user information 2042 (S04). The group communication manager 202 (S04) sends all or part of the user information 2042, the group communication information 2041, and the content information 2043 to the control terminal 10 together with information prompting the user of the control terminal 10 to send a group communication control signal (S05).

The control terminal 10 receives the user information 2042, the group communication information 2041, the content information 2043, and the information prompting the user of the control terminal 10 to send a group communication control signal (S06). If the control terminal 10 cannot receive the information, the control terminal 10 requests the information again (S06). Information designating the participating users and/or contents selected by the monitoring user is input at the control terminal 10, and the group communication control signal is sent to the communication control apparatus 20 (S07).

The control terminal manager 203 of the communication control apparatus 20 receives via the information transmitter/receiver 201 (group communication control signal receiver) from the control terminal 10 the group communication control signal that includes the control user ID for identifying the control terminal 10 and information (group ID) for identifying group communication to be controlled. Then, the control terminal manager 203 authenticates the control terminal 10 and transfers the group communication control signal to the group communication manager 202, in order to register the control terminal 10 as a control terminal of the group communication (S08).

The group communication manager 202 registers the control user ID in the control terminal field of the group communication information 2041 (FIG. 4A) of the group communication to be controlled (S09). If the control user ID has already been registered, the registration process S09 is skipped.

The group communication manager 202 determines whether only one control terminal has been specified in the target group communication information 2041 (S10). If yes, that is, if the terminal is registered as the first control terminal in the group communication information 2041, the group communication manager 202 outputs a control signal to the group communication controller 205. To be more specific, while group communication is in progress, a group communication change control signal based on the group communication control signal is sent to the group communication controller 205. While group communication is not performed, the group communication manager 202 sends to the group communication controller 205 a group communication start control signal based on the group communication control signal, to start connection of the group communication terminals 30.

In accordance with the change control signal or start control signal, that is, in accordance with the group ID, participating user ID, connection pattern, schedule, and content-identifying information, the group communication controller 205 next inserts video, audio, and other content, modifies the connection pattern, and performs other processing (S14). This starts the group communication between the group communication terminals 30 or changes the connection pattern accordingly (S15). The group communication controller 205 notifies the control terminal 10 of the completion of the insertion of content, the modification of the connection pattern, and the other processing, through the group communication manager 202 and the control terminal manager 203 (S16). When receiving the completion notice sent in step S16, the group communication manager 202, the control terminal manager 203, and the control terminal 10 execute processes corresponding to the change control signal or the start control signal, if necessary.

If the group communication controller 205 determines in step S10 that two or more control terminals have been specified in the target group communication information 2041, that fact is reported to the control terminal manager 203. The control terminal manager 203 performs the process of step A or B, which will be described later with reference to FIG. 7 or 8, according to the application, and the exclusive control-signal controller 2033 (determining section) of the control terminal manager 203 determines whether or not the group communication should be controlled in accordance with the group communication control signal.

When the exclusive control-signal controller 2033 of the control terminal manager 203 determines that the group communication should be controlled in accordance with the group communication control signal, the group communication configuration deciding section 2031 outputs a control signal for setting or changing information of the group concerning the group communication (such as the number of the group users, the participating users, the start time, and the end time) to the group communication manager 202. The subgroup configuration changing section 2032 sends to the group communication manager 202 a control signal for setting or changing information of a subgroup concerning subgroup communication forming the group communication (such as the number of users participating in each subgroup, the participating users, the start time, and the end time), in accordance with the group communication control signal. The audio/video insertion section 2035 sends to the group communication manager 202 a control signal for inserting the content into the group communication or subgroup communication (S121).

In accordance with the control signal from the control terminal manager 203, the group communication manager 202 updates the group information and transfers the control signal to the group communication controller 205 (S13).

Then, in accordance with the control signal received from the group communication manager 202, the group communication controller 205 inserts the content, modifies the connection pattern, and performs other processing if the group communication is changed to subgroup communication (S14 to S16).

Figure 7:
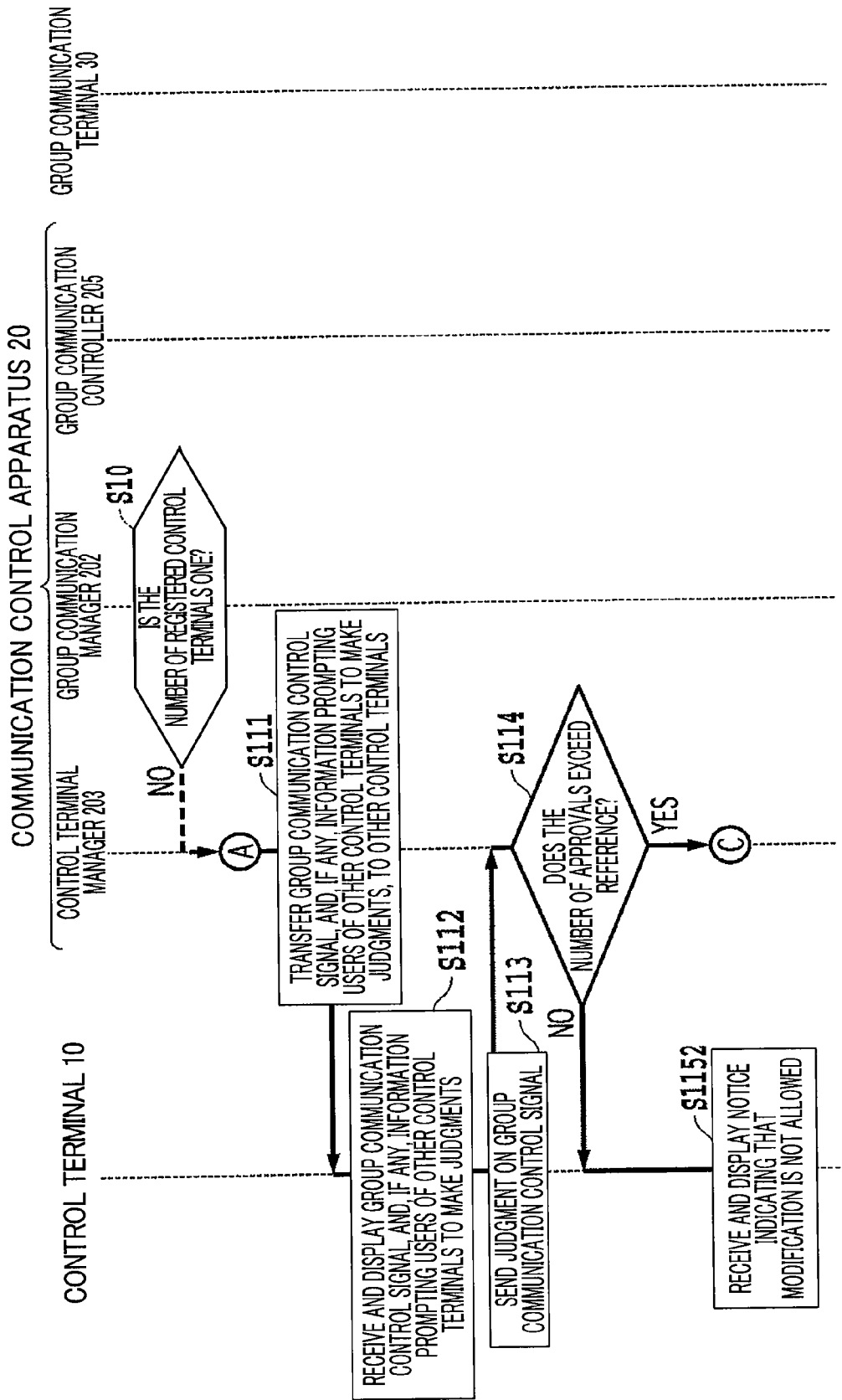
FIG. 7 shows a flowchart of another process in the communication system according to the embodiment of the present invention.
Figure 8:
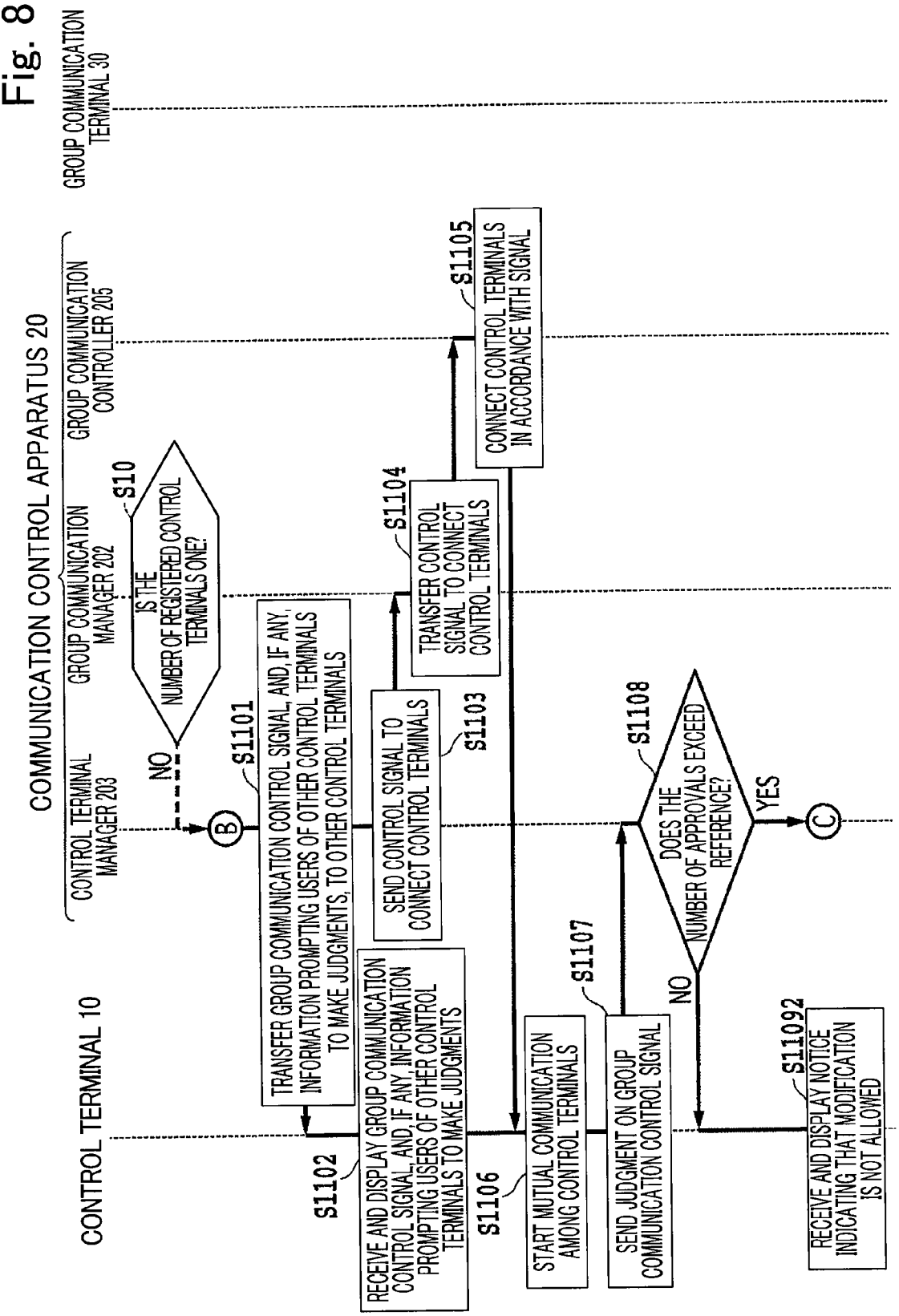
FIG. 8 shows a flowchart of another process in the communication system according to the embodiment of the present invention.

FIGS. 7 and 8 are flowcharts of example applications (majority decision application and agreement application) implemented by the exclusive control-signal controller 2033 of the control terminal manager 203 for controlling the group communication control signal to be output to the group communication manager 202. The application part may be separately executed by an external communication control apparatus and linked with other features of the communication control apparatus 20 of the embodiment.

FIG. 7 is a flowchart of an application for making a determination as to whether or not the group communication should be controlled in accordance with the group communication control signal received by the communication control apparatus 20 from a control terminal 10 when two or more control terminals 10 have been registered as control terminals of the group communication. This determination is made by majority among one or more other control terminals 10.

If the group communication controller 205 determines in step S10 that two or more control terminals 10 are included in the target group communication information 2041, the exclusive control-signal controller 2033 of the control terminal manager 203 (transfer section) transfers the group communication control signal received from the transmission-source control terminal 10, to the one or more other control terminals 10 (S111). In this operation, it is desired to send also information prompting the users of the other control terminals 10 to judge whether or not the group communication should be controlled in accordance with the group communication control signal received from the communication control apparatus 20.

The other control terminals 10 receive and display the group communication control signal and, if any, the information prompting the user of each control terminal 10 to make a judgment on the group communication control signal (S112), and send the judgments input by the users to the communication control apparatus 20 (S113).

The exclusive control-signal controller 2033 (determining section) of the control terminal manager 203 receives the judgments (information indicating opinions related to the group communication control signal) from the control terminals 10 via the information transmitter/receiver 201 (opinion receiver) and determines whether or not the number of approvals obtained from the other control terminals 10 exceeds a predetermined reference level within a predetermined period of time (S114).

If the number of approvals obtained from the other control terminals 10 exceeds the predetermined reference level within the predetermined period of time, the exclusive control-signal controller 2033 determines that the group communication should be controlled in accordance with the group communication control signal, and then, the control terminal manager 203 performs the process of step 121 (FIG. 6). Any period of time and any reference level of approvals can be predefined. If the number of approvals does not exceed the reference level, the control terminal 10 which has sent the group communication control signal is notified that the modification is impossible, and that fact is displayed (S1152).

FIG. 8 is a flowchart of an application for making a determination as to whether or not the group communication should be controlled in accordance with the group communication control signal received by the communication control apparatus 20 from a control terminal 10 when two or more control terminals 10 have been registered as control terminals of the group communication. This determination is made by agreement among all the control terminals 10.

If the group communication controller 205 determines in step S10 that two or more control terminals 10 are included in the target group communication information 2041, the exclusive control-signal controller 2033 (transfer section) of the control terminal manager 203 transfers the group communication control signal received from the transmission-source control terminal 10, to the one or more other control terminals 10 (S1011). In this operation, it is desirable to send also information prompting the users of the other control terminals 10 to judge whether or not the group communication should be controlled in accordance with the group communication control signal received from the communication control apparatus 20. The other control terminals 10 receive and display the group communication control signal and, if any, the information prompting the user of each control terminal to make a judgment (S1102).

The exclusive control-signal controller 2033 of the control terminal manager 203 sends to the group communication manager 202 a control signal for connecting all the control terminals 10 together, to start communication among the control terminals 10 (S1103). The group communication manager 202 transfers to the group communication controller 205 the control signal for connecting the control terminals 10 together (S1104).

The group communication controller 205 (mutual communication permitter) connects the control terminals 10 (including the control terminal which has sent the group communication control signal and the other control terminals) together in accordance with the control signal received from the group communication manager 202 (S1105). This starts mutual communication among the control terminals 10 (S1106) and allows the corresponding users to have a discussion on the group communication control signal. Then, the control terminals 10 send the judgments input by the users to the communication control apparatus 20 (S1107).

The exclusive control-signal controller 2033 (determining section) of the control terminal manager 203 receives the judgments (information indicating opinions related to the group communication control signal) from the control terminals 10 via the information transmitter/receiver 201 (opinion receiver) and determines whether or not the number of approvals obtained from the control terminals 10 exceeds a predetermined reference level within a predetermined period of time (S114).

If the number of approvals obtained from the control terminals 10 exceeds the predetermined reference level within the predetermined period of time, the exclusive control-signal controller 2033 determines that the group communication should be controlled in accordance with the group communication control signal, and then, the control terminal manager 203 performs the process of step 121 (FIG. 6). Any period of time and any reference level of approvals can be predefined. If the number of approvals does not exceed the reference level, the control terminal 10 which has sent the group communication control signal is notified that the modification is impossible, and that fact is displayed (S11092).

As described above, the present invention provides a communication control apparatus and a method which allow a user not participating in group communication to control the group communication.

What is claimed is:

1. A communication control apparatus comprising:
    a registration request signal receiver configured to receive from each of a plurality of terminals a control terminal registration request signal requesting registration of the terminals as a plurality of respective control terminals that do not participate in group communication, and that control the group communication, the group communication performed among a plurality of group communication terminals over a communication network;
    a registration section configured to register the terminals as control terminals;
    a registration-information transmitter configured to send through the communication network to the terminals information indicating that the terminals have been registered as control terminals;
    a group communication control signal receiver configured to receive through the communication network from a first one of the control terminals a group communication control signal for controlling the group communication;
    a determining section configured to determine whether the group communication should be controlled in accordance with the group communication control signal received from the first one of the control terminals;
    a transfer section configured to transfer the group communication control signal received from the first one of the control terminals to at least a second one of the control terminals; and
    an opinion receiver configured to receive information indicating an opinion related to the group communication control signal, the information indicating the opinion received from the at least a second one of the control terminals;
    wherein the determining section is further configured to determine, based on the information indicating the opinion, whether the group communication should be controlled in accordance with the group communication control signal; and
    a group communication controller configured to start or change the group communication in accordance with the group communication control signal.

2. A communication control apparatus comprising:
    a registration request signal receiver configured to receive from each of a plurality of terminals a control terminal registration request signal requesting registration of the terminals as a plurality of respective control terminals that do not participate in group communication, and that control the group communication, the group communication performed among a plurality of group communication terminals over a communication network;
    a registration section configured to register the terminals as control terminals;
    a registration-information transmitter configured to send through the communication network to the terminals information indicating that the terminals have been registered as control terminals;
a group communication control signal receiver configured to receive through the communication network from a first one of the plurality of control terminals a group communication control signal for controlling the group communication;
a determining section configured to determine whether the group communication should be controlled in accordance with the group communication control signal received from the first one of the plurality of control terminals;
a transfer section for transferring the group communication control signal received from the first one of the plurality of control terminals to at least a second one of the plurality of control terminals;
a mutual communication permitter configured to connect the at least a second one of the plurality of control terminals and the first one of the plurality of control terminals from which the group communication control signal was received, the at least a second one of the plurality of control terminals and the first one of the plurality of control terminals all connected by the mutual communication permitter to allow users of the first one of the plurality of control terminals and the at least a second one of the plurality of control terminals to participate in a discussion regarding the group communication control signal; and
an opinion receiver configured to receive information indicating an opinion related to the group communication control signal, the information indicating an opinion related to the group communication control signal received from the first one of the plurality of the control terminals and the at least a second one of the plurality of control terminals;
wherein the determining section is further configured to determine, based on the information indicating the opinion, whether the group communication should be controlled in accordance with the group communication control signal.

3. A communication control apparatus comprising:
a registration request signal receiver configured to receive from each of a plurality of terminals a control terminal registration request signal requesting registration of the terminals as a plurality of respective control terminals that do not participate in group communication, and that control the group communication, the group communication performed among a plurality of group communication terminals over a communication network;
a registration section configured to register the terminals as control terminals;
a registration-information transmitter configured to send through the communication network to the terminals information indicating that the terminals have been registered as control terminals;
a group communication control signal receiver configured to receive through the communication network from a first one of the plurality of control terminals a group communication control signal for controlling the group communication, wherein the group communication controller is configured to insert content into the group communication, the content inserted into the group communication in accordance with content-identifying information included in the group communication control signal received from the first one of the control terminals;
a content storage configured to store the content;
a content information transmitter configured to read content information from the content storage, the content information identifying the content as a content candidate selectable for insertion into the group communication;
the content information transmitter further configured to transmit the content information to the first one of the control terminals; and
a content reader configured to read the content, from the content storage, the content corresponding to the content-identifying information included in the group communication control signal received from the first one of the control terminals;
wherein the content read by the content reader is inserted into the group communication by the group communication controller.

* * * * *